Oct. 30, 1951 — H. W. NIEMAN — 2,573,353
ROLLING MILL
Filed Oct. 4, 1945 — 9 Sheets-Sheet 1

Fig. 1.

Inventor
Henry W. Nieman

Oct. 30, 1951  H. W. NIEMAN  2,573,353
ROLLING MILL
Filed Oct. 4, 1945  9 Sheets-Sheet 8

Inventor
Henry W. Nieman.
By R. S. A. Dougherty.
Attorney

Oct. 30, 1951   H. W. NIEMAN   2,573,353
ROLLING MILL
Filed Oct. 4, 1945   9 Sheets-Sheet 9

Inventor
Henry W. Nieman,
By R. S. C. Dougherty
Attorney

Patented Oct. 30, 1951

2,573,353

UNITED STATES PATENT OFFICE 2,573,353

ROLLING MILL

Henry W. Nieman, Bethlehem, Pa., assignor to Bethlehem Steel Company, a corporation of Pennsylvania Application October 4, 1945, Serial No. 620,205

10 Claims. (Cl. 80—56)

My invention relates to rolling mills and more especially to a two-high cold rolling mill for producing strip for sheet and tin plate which has certain decided advantages over the four-high rolling mills usually used for this purpose.

In mills for the rapid reduction of sheet metal by cold rolling it is well known that the mill housing and other members should be as stiff as possible, in order to hold the gauge within close limits, the rolls should not be of too great a diameter, but must be supported in such a way as to prevent deflection; the expansion due to temperature changes in the rolls must be so controlled that the shape of the pass is not undesirably affected; and that all the adjustments and controls on the mill be conveniently and accurately controlled.

It is the purpose of my invention to provide a design of mill wherein the above features are secured as well as other advantages which will be apparent from the description.

One of the objects of my invention relates to the manner of supporting the working rolls. In my invention the backing rolls are dispensed with and the working rolls are each supported by a plain bearing which extends the whole length of the roll, and is adapted to embrace substantially 120 degrees of the upper surface of each of the upper rolls and the same amount of the lower surface of the lower rolls.

The surface of each roll itself is thus the journal of the bearing. Rolls for cold rolling are extremely hard and have polished surfaces so that they are entirely suitable for use as bearing members.

Another advantage of my invention relates to the lower first cost of construction. The housing is of much less height than in a four-high mill, the windows for removing the rolls are much smaller and the mill consequently has less breadth, and the expensive items of backing rolls and their roller bearings are dispensed with.

Another object of the invention is to produce greater stiffness. Since the framework of the mill is more condensed, and the backing rolls eliminated, the spring of the mill will be greatly reduced. This is an important matter in securing accuracy of gauge, a difficult matter with four-high mills. Stiffness, of course, also simplifies the feeding difficulty if the mill is used to roll short lengths.

A further object of my invention relates to the better control of contour. The backing rolls of four-high mills are given a crown to correct for spring, and this must be adjusted by grinding if the width of sheet rolled is materially changed. In my invention the mill is provided with three or more screw downs along the length of each upper roll bearing by means of which contour can be corrected as a simple adjustment.

A still further advantage of my invention relates to the less roll damage. In a four-high mill any foreign matter that passes between the working and backing rolls causes a dent in each of them, and this is true even if the material is softer than the rolls, such as lint, splinters of the sheet being rolled, hardened grease, etc. In my mill this material, if not removed by the wipers, will lodge in the bearings and will scratch the roll only if it is harder than the roll surface. In the worst case the damage will be very shallow.

With the foregoing and other objects in view, the invention will be more fully described hereinafter, and will be more particularly pointed out in the appended claims.

Referring now to the accompanying nine sheets of drawings which form a part of this specification and on which like characters of reference indicate like parts.

Figure 9:
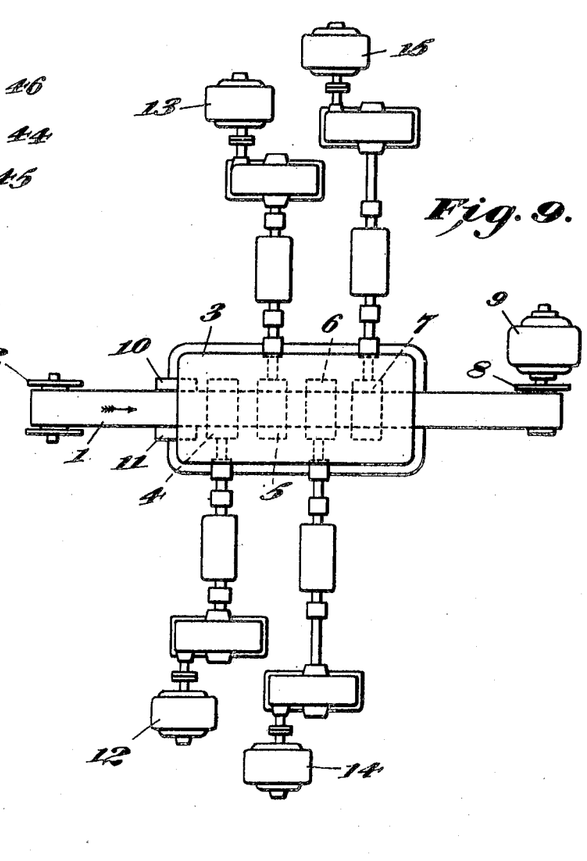
Fig. 9 shows a diagrammatic view of the mill with driving units, reel and unreeling stands as arranged for the rolling of wide strip.

Referring now to the various characters of reference on the drawing:

The numeral 1 indicates the strip which is initially wound on a spool 2 and is drawn from it into the mill 3, passing through four sets or pairs of rolls 4, 5, 6 and 7 and is taken off on the reel 8 which is driven by a motor 9. Guides 10 and 11 are provided to center the strip 1 at the point of entry into the mill 3. The pairs of rolls are driven by the individual motors 12, 13, 14 and 15 through reducing gears, pinions and couplings in any well known manner as indicated, and it will be understood that electrical control equipments are provided for each motor so that their individual speeds can be adjusted to the proper values.

Figure 1:
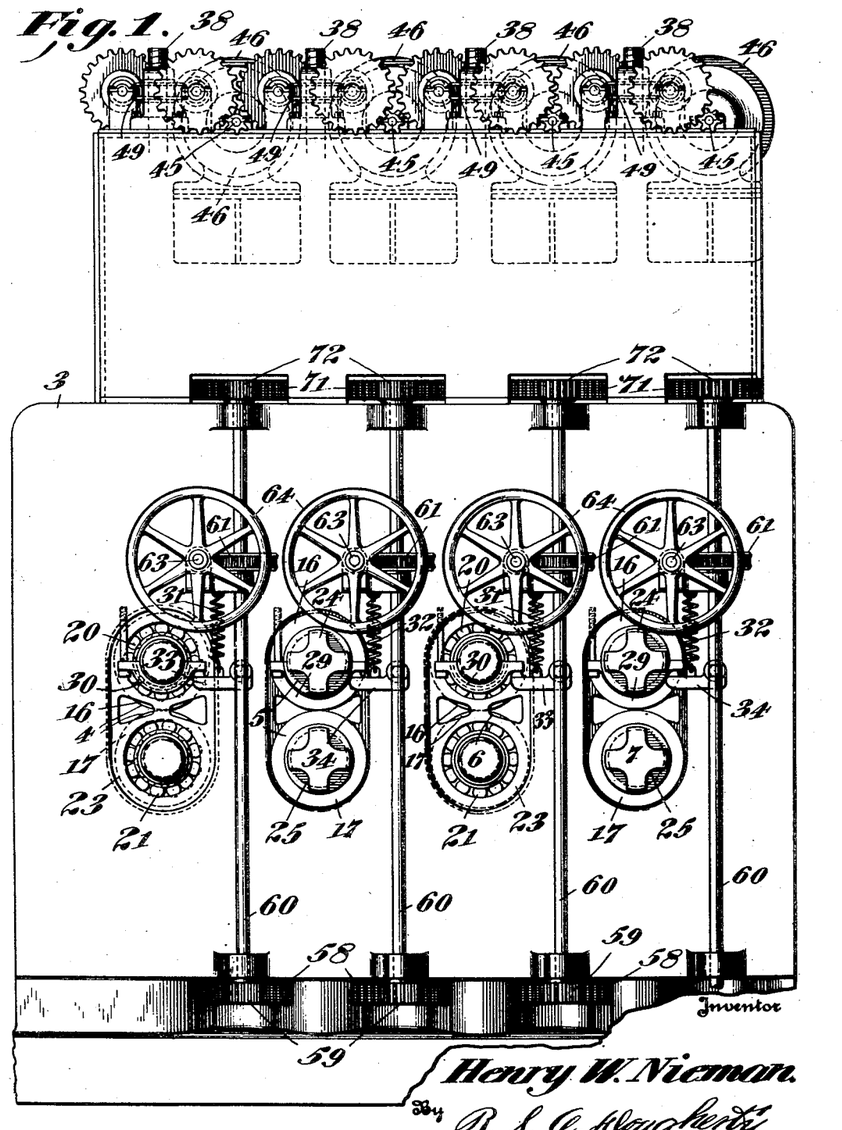
Figure 1 is a side elevation of a two-high mill having four sets of working rolls in which all of the said working rolls are adapted to be backed up the full length by bearings applied directly to the working rolls.
Figure 2:
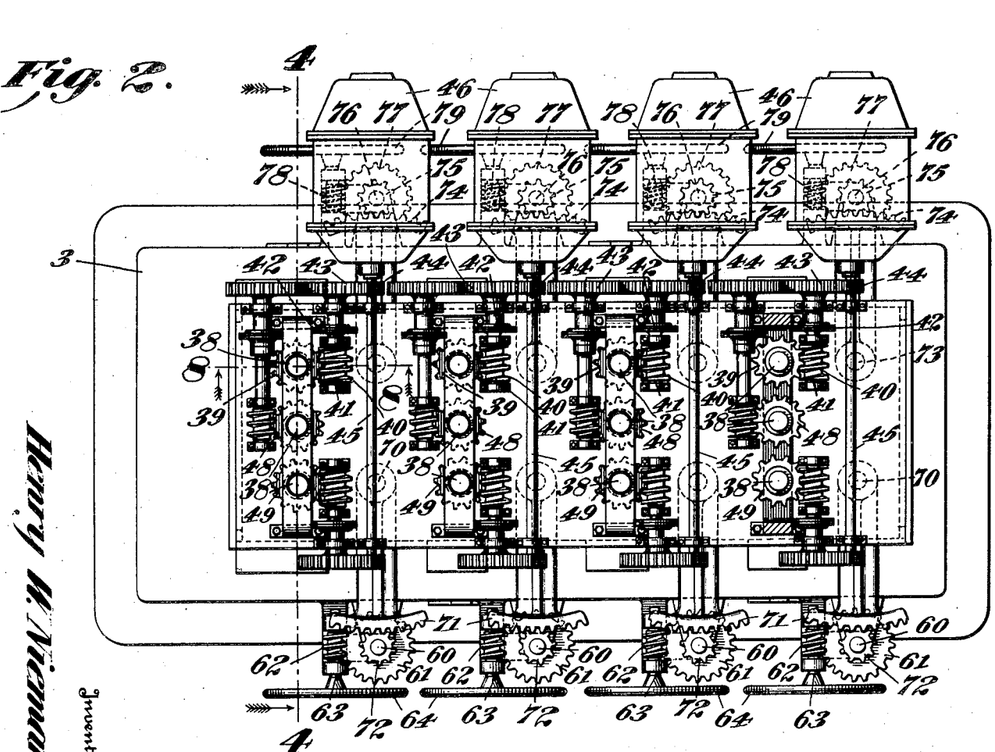
Fig. 2 is a top plan view of the mill shown in Fig. 1.
Figure 3:
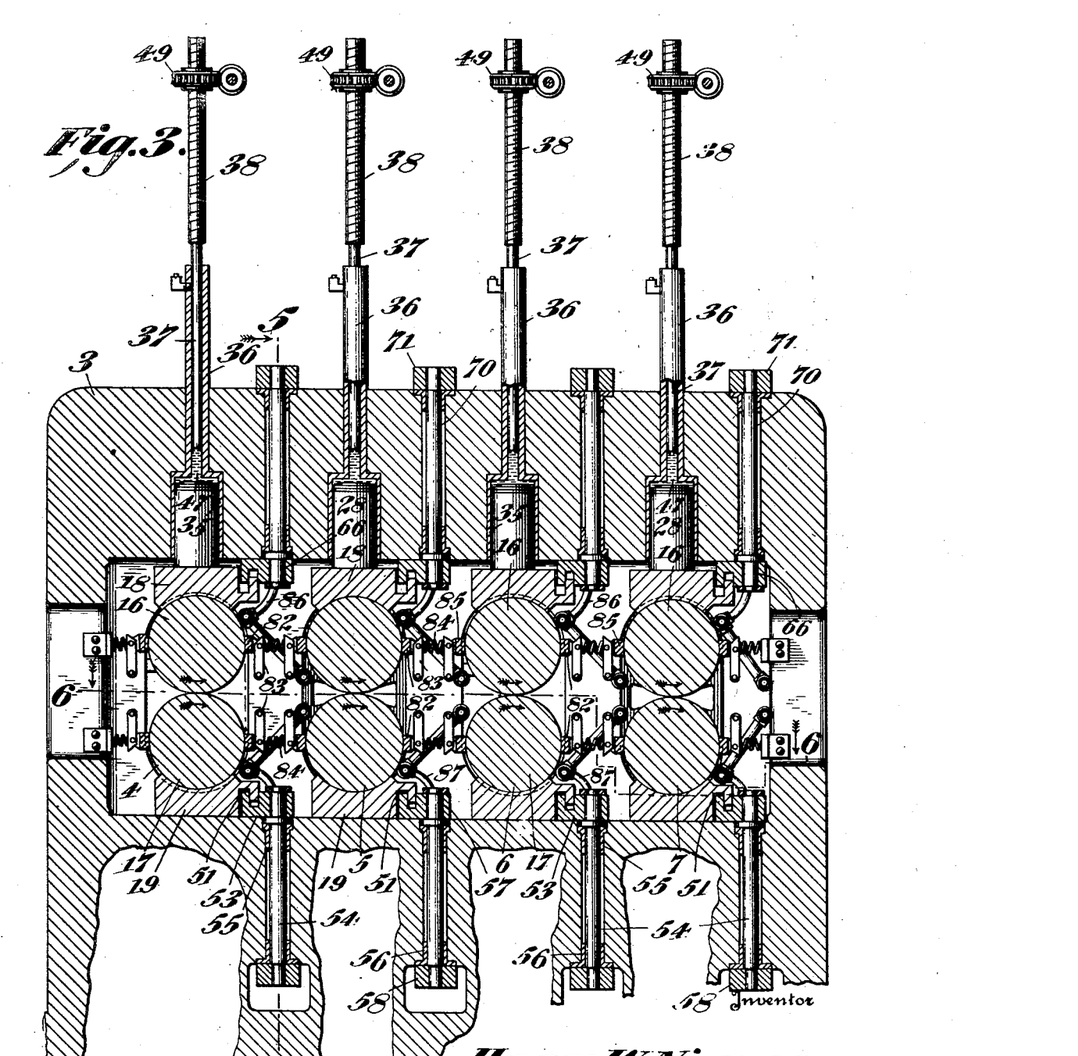
Fig. 3 is a vertical longitudinal section of the mill taken on the line 3—3 of Fig. 6.
Figure 4:
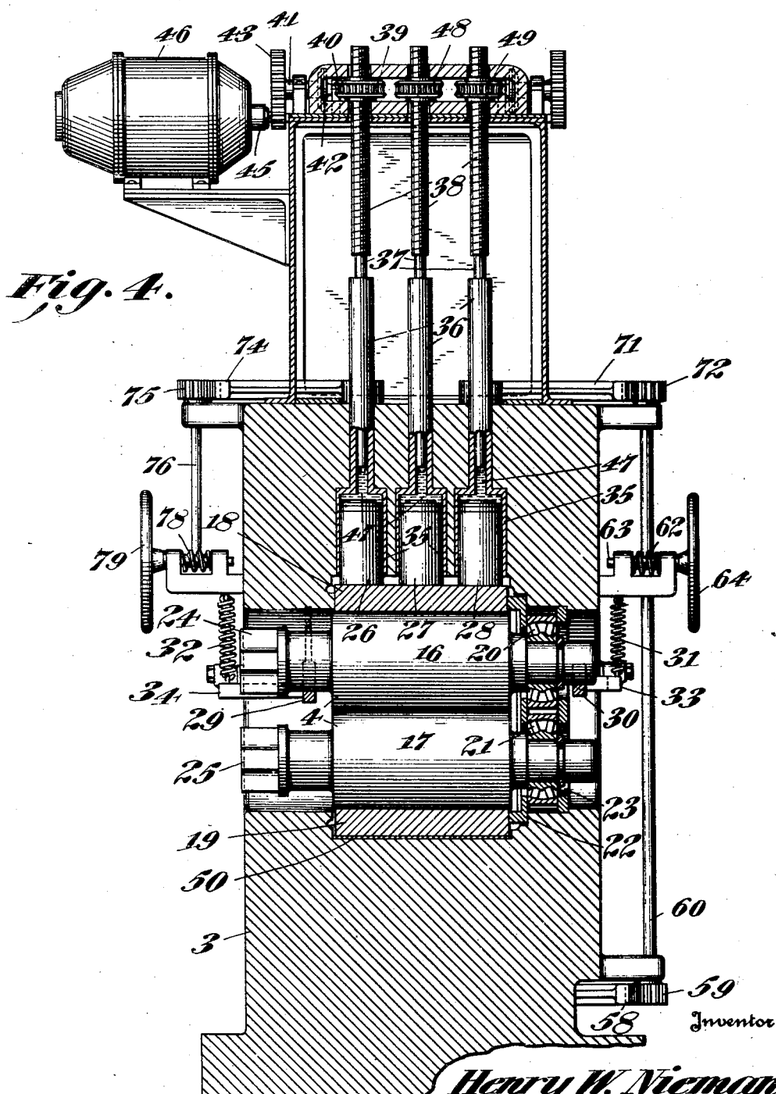
Fig. 4 is a vertical transverse section through the mill taken on the line 4—4 of Fig. 2.
Figure 5:
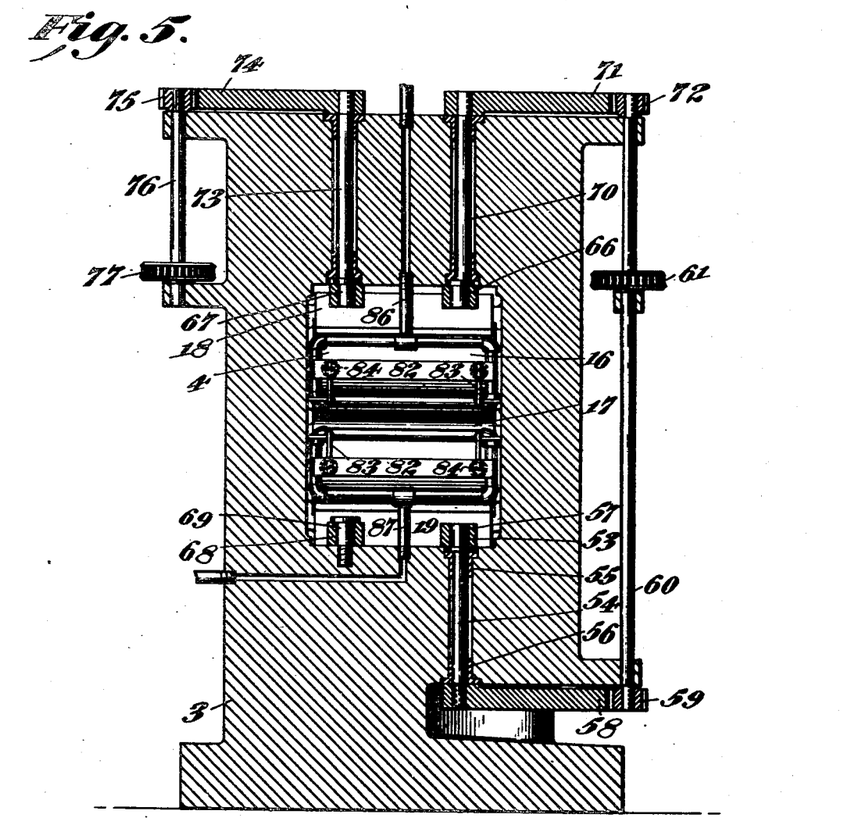
Fig. 5 is a vertical transverse section taken on the line 5—5 of Fig. 3.

As shown more clearly in Figs. 3 and 4 the pressures of the upper and bottom rolls 16 and 17 are transmitted to the housing through the upper and bottom bearings 18 and 19 respectively, each of said bearings extend the full length of the roll face and thus operates on the same portions of the roll surfaces which is used in the reduction of the sheet. Each pair of rolls 16 and 17 with the main bearings 18 and 19 and the thrust bearings 20 and 21, which later take up the end thrust of the rolls, but are free to move up and down and forward and backward between the restraining plates 22 and 23 to adjust themselves to the location of the rolls. In addition these thrust bearings are made self aligning. The drive is applied to the rolls through spline couplings 24 and 25, the drive coming from opposite sides of the mill for alternate pairs of rolls.

A screw down is applied to each of the upper bearings 18 by three hydraulic pistons 26, 27 and 28. The yokes 29 and 30 on the roll necks serve to hold the upper roll against the upper bearings and to force the hydraulic pistons upward when the pressure is removed from the hydraulic system. These yokes are acted upon by powerful springs 31 and 32 through the levers 33 and 34.

The mechanism of the screw down is shown in Figs. 2, 3, 4 and 8, the latter being a section through one of the screw downs of roll pair 4, but is identical in every way with the other screw downs.

Figure 8:
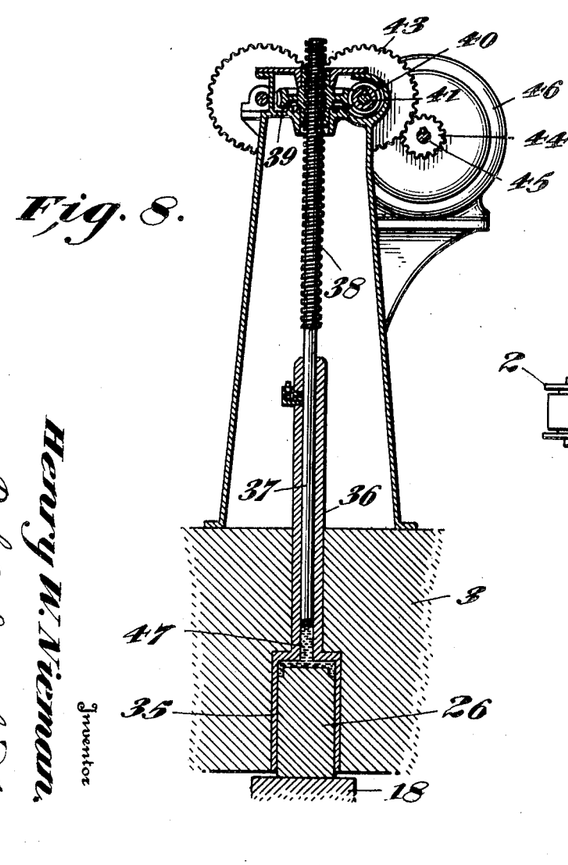
Fig. 8 is a vertical section taken on the line 8—8 of Fig. 2 showing one of the screw down mechanisms for one of the pressure pistons engaging one of the backing up bearings for one of the top working rolls.

The pistons 26, 27 and 28 are each provided with a cylinder 35 each provided with a cylinder 36 formed integral therewith, but having a smaller bore. The latter containing a long piston 37, the upper end of which is threaded as at 38 and adapted to be moved up and down by means of a combined nut and worm wheel 39 which is actuated by a worm 40 on shaft 41 through the magnetic clutch 42 and the gear 43 on shaft 41 and the pinion 44 on the shaft 45 of the motor 46. In order to give greater flexibility to the pressure applied to the pistons the top end of each cylinder 35 and the lower portion of the bore of cylinder 36 is filled with oil or the like as at 47. The worm wheels 48 and 49 of the other two screw downs are similarly connected through magnetic clutches and gearing to the same motor. By controlling the direction of rotation of the motor and the magnetic clutches the three screws may be raised or lowered together or independently.

Figure 6:
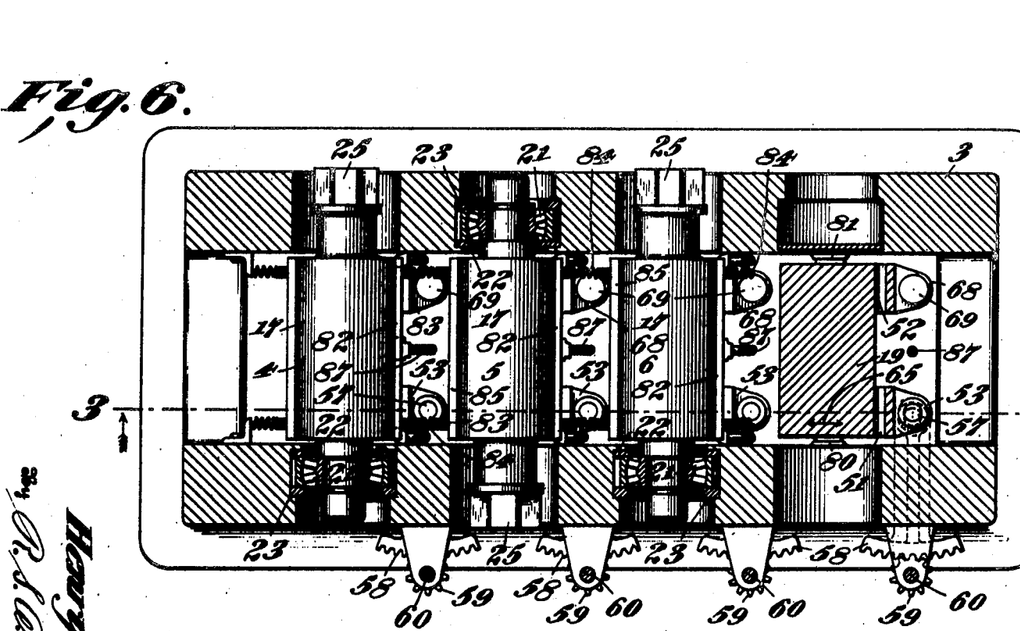
Fig. 6 is a horizontal longitudinal section taken on the line 6—6 of Fig. 3.
Figure 7:
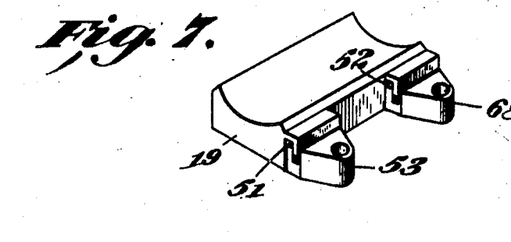
Fig. 7 is a perspective view of one of the bearings for backing up the working rolls.

It will be understood that this description of the screw down relates to one pair of rolls and that the screw downs for the other three pair of rolls will be similar. By these arrangements a large movement of the piston 37 is required to give a small adjustment of the rolls and this is still further reduced through the gearing so that very accurate adjustment of the roll pass is possible. Since the mill is intended primarily for rolling thin material, only a small range in the screw down is necessary. Each time the rolls are ground the bearings 18 and 19 must be turned out to fit the new diameters. The change in the thickness of the pass caused by such machining is not taken care of by the screw down but by shims 50 under the lower bearing and possibly also over the upper bearing. The method of positioning the main bearings 18 and 19 is shown in Figs. 3, 6 and 7. Each bearing has a slot along one edge at each end. For bearing 19 these slots are shown at 51 and 52. Into these fit the tongues of eccentric blocks, one of which is shown at 53. Shafts 54 are journaled in the housing at 55 and 56 each having at its upper end and eccentric 57 of small throw, over which fits the eccentric block 53. At the lower end of each shaft 54 is keyed a toothed segment 58, which extends to the side of the housing and meshes with a pinion 59 keyed to a shaft 60. To each of these shafts 60 is keyed a worm wheel 61 which meshes with a worm 62 on a shaft 63 having a handwheel 64 mounted thereon, a revolution of this handwheel 64 will through these connections cause a revolution of the eccentric and a fore or aft movement of one end of the bottom bearing 19 as shown by the double arrow 65, indicated in Fig. 6. For the two bearings 18 and 19 for each pair of rolls three such eccentric adjustments are provided, two for the upper bearing 18 as shown at 66 and 67 and one for the bottom bearing 19 at 57, as already described. In addition the bottom bearing 19 is provided with a block 68 identical with the other eccentric blocks, but fitting on a fixed stud 69.

The adjustment of eccentric 66 is through shaft 70 toothed segment 71 on top of the mill and a pinion 72, actuated by shaft 60 which also as previously described actuates eccentric 57 for adjustment of the lower bearing 19. The rotation of the handwheel 64 through these arrangements, causes an adjustment of like amount and direction on corresponding ends of the bearings 18 and 19.

The eccentric adjustment 67 on the opposite end of the upper bearing 18 is connected in a similar manner through shaft 73 toothed segment 74 meshing with a pinion 75 on shaft 76, which is provided with a worm wheel 77 meshing with a worm 78 actuated by a handwheel 79. With these arrangements it follows that an adjustment to bring the axes of the pair of rolls into parallel relation is brought about by the handwheel 79, whereas rotation of the handwheel 64 will cause rotation about the vertical of both roll axes simultaneously. The ends of the bearings 18 and 19 are provided with abutments 80 and 81, which abut against flat faces of the housing and thus prevent movement of the bearings parallel to axes of the rolls.

Wipers are provided for the full length of the face on each side of each roll one of which is shown at 82 which is supported by swinging arms 83 and pressed against the roll face by springs 84 which in this case also serves as a spring for the wiper 85 on the neighboring roll. Pipes for the supply of oil are shown at 86 and 87. Through connected pipes provided with perforations, these supply lubricant both to the roll faces, immediately before their contact with the bearings 18 and 19, and to the strip as it is about to enter each pass. This oil serves not only as a lubricant but also as a cooling medium and in addition to the wipers tends to remove foreign particles from the rolls.

In addition to the arrangements shown it is intended that suitable indicators be provided for showing the position of each of the screw downs, other indicators for the various handwheels for adjusting the axes of the rolls, and if desired pressure gauges on the hydraulic system of each screw down to show rolling pressure. Gauges for calipering the strip between passes may also be provided. An oil cleaning, cooling and circulating system will also form part of the accessory equipment. In the mill as shown no guides are shown for the strip. It may in certain circumstances be found desirable to use bottom guides or both top and bottom guides between each pass.

Although the rolls have been shown as solid in the drawings it is to be understood that hollow rolls with cooling circulation may be employed.

Figure 10:
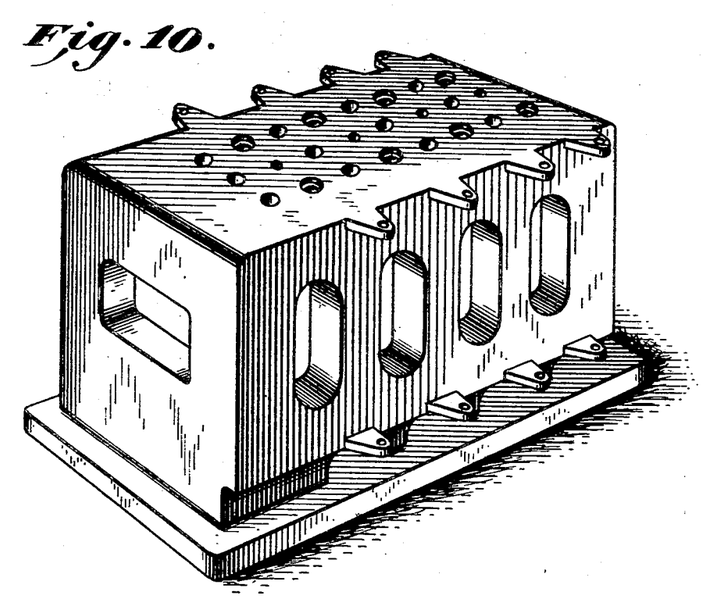
Fig. 10 is a perspective view of the roll housing which has been designed to secure the maximum stiffness in the system.
Figure 11:
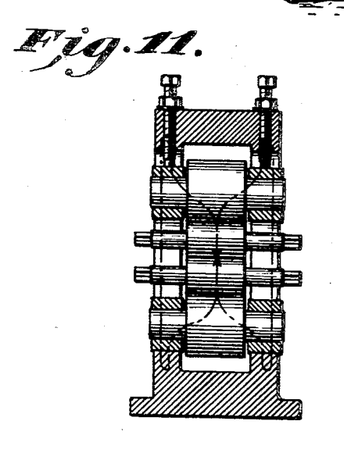
Fig. 11 is a vertical section of a four-high mill with lines showing the transmission of the forces from the center of the roll pass to the top and bottom of the housing.
Figure 12:
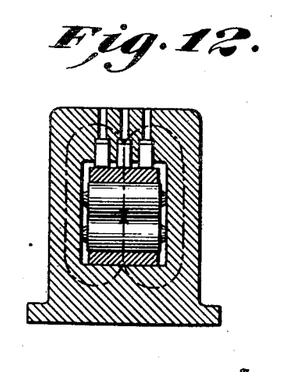
Fig. 12 is a vertical section of a set of rolls of my two-high mill showing a comparison of the transmission of the forces from the center of the roll pass to the top and bottom of the housing.

Fig. 10 shows a perspective of the roll housing which has been designed to secure the maximum stiffness in the system. A comparison of this structure with that of an ordinary four-high mill is shown in Figs. 11 and 12.

The lines show the transmission of the forces from the center of the pass of the top working roll around to the center of the pass of the bottom working roll. In the case of the four-high mill this force travels from the working roll into the backing roll, lengthwise of this roll into the roll necks, then into the neck bearings, the screw and upper cap of the housing, then down the vertical members into the lower backing roll neck bearings, the roll necks, and into the lower working roll. In the case of my two-high mill, Fig. 12, the forces pass from the working roll into the upper bearing, the pistons of the hydraulic cylinders, down through the vertical members of the housing, into the bottom bearing and into the lower working roll. Not only is the path considerably shorter in this case, but the various members receive their pressures in a more direct manner. In addition the line contact between the backing and working roll, and between the roller bearings and their races in case these are used, are avoided thus eliminating the spring that occurs at these points. It is a fair assumption moreover that the upper portion of the housing can be made stiffer as a beam than the backing roll, and therefore lessen the spring, due to deflection at this point.

Figure 13:
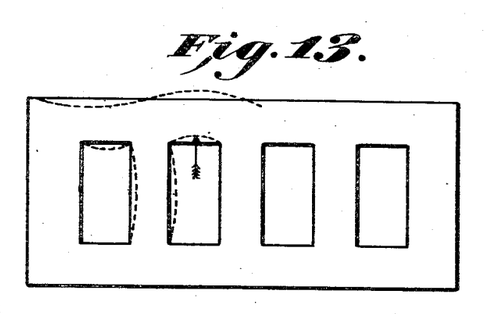
Figs. 13, 14 and 15 show diagrammatically side views of the mill in order to bring out more clearly the advantages that follow by mounting the several pairs of rolls in an integral housing.
Figure 14:
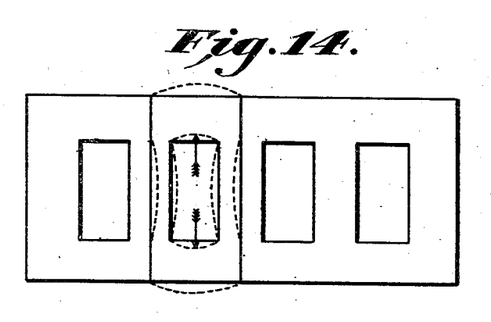
Figure 15:
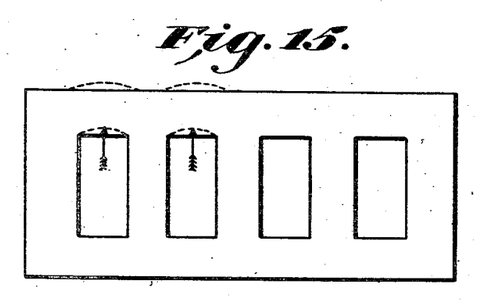

Figs. 13, 14 and 15 show diagrammatically a side view of the mill in order to bring out more clearly the advantages that follow by mounting the several pairs of rolls in an integral housing. Fig. 13 shows an integral construction and Fig. 14 the employment of separate housings for each pair of rolls, the spacing between pairs of rolls being the same in each case. When forces are applied as shown by the arrows the deflection that takes place is shown in an exaggerated scale by the dotted lines. The top and bottom members of each housing are in effect beams supported at each end. In the construction of Fig. 13 the whole top of the mill acts as a continuous beam, that is, each span approximates in effect a beam fixed at each end, and gives much less deflection.

Fig. 15 shows the effect of applying loads to two adjacent pairs of rolls. It will be seen that the deflection of Fig. 13 is decreased when a load is applied to the next pair. The stretch of the tension members is of course greater, but this effect is usually small compared with the beam deflections, so that equal loads on all pairs of rolls may cause less deflection than a load on one single pair.

A further advantage is the narrower windows possible with my mill compared with a four-high mill stand. In the latter case it is necessary to have a window large enough to pass the large diameter backing rolls, whereas in the former a window just wide enough for the working rolls will suffice.

In order to correct drift and center the strip exactly, arrangements have been made so that one end of each pair of rolls can be moved together through a small angle, and thus while maintaining parallelism between the two rolls of a pair to change their angle in relation to the strip. The handwheels for this adjustment are all arranged along one side of the mill, one of them shown at 64. The effect of canting one pair of rolls while the others remain unchanged is obviously to cause the strip to move edgewise in one direction or the other. The proper manipulation of these adjustments will therefore keep the strip central in its passage throughout the length of the mill.

As a pair of rolls heats up in operation there will be an expansion in diameter. In the case of an ordinary two-high mill with bearings on the roll necks a considerable difference of temperature is likely to exist between middle and ends of roll. In my mill, however, the bearing extends the length of the roll face, and much more uniform heating occurs. Moreover such differences as exists here is easily corrected by manipulation of the center screw down on each roll.

Referring to Fig. 4 it is seen that the upper bearing 18 presses for its full length against the body of roll 16, while on its top surface it abuts against the three pistons 26, 27 and 28. Since this bearing resists the full rolling pressure it is necessary that it have the best possible lubrication. This is secured by the use of a thin lubricant either oil or water and by providing a bearing of considerable axial length compared with the diameter of the roll; and having a smooth continuous surface. Thus with sufficient speed on the rolls the film of lubricant which is carried into the space between the roll and the bearing by the roll surface is prevented from endwise escape and provides the continuous film. While the bearing must be continuous and possess reasonable longitudinal stiffness for these reasons of lubrication it must also be flexible enough to transmit the individual forces of the pistons to the roll body. In this example there are three points of adjustment along each roll, but for wide strip a larger number may be found desirable.

The mill as described shows four pairs of rolls. It is obvious, however, that a greater or less number may be employed. Moreover other forms of screw down or driving means than those shown may be used.

The mill as described applies specifically to the rolling of thin, wide strip, but the type of construction may equally well be applied for other service.

Although I have shown and described my invention in considerable detail, I do not wish to be limited to the exact construction shown and described, but may use such substitutions, modifications or equivalents thereof, as are embraced within the scope of my invention, or as pointed out in the claims.

Having thus described my invention, what I claim as new and desire to secure by Letters Patent is:

1. In a rolling mill, comprising an integral housing having top and bottom walls adapted to form continuous beams for the housing, end and side walls connecting the top and bottom walls, a plurality of pairs of working rolls mounted in the housing and arranged to operate in sequence, windows in the side walls of the housing to allow inserting or removing the pair of working rolls, supporting bearings mounted adjacent to the top and bottom walls in the housing said bearings being disposed at the top and bottom of each pair of working rolls, each of said bearings being formed in one piece and having its inner face provided with a concaved groove in which said working rolls are journaled for supporting the working rolls throughout their entire working length, a plurality of hydraulic pistons for applying pressure to each of the top bearings at intermediate points for controlling the effective shape of the working rolls, means for actuating the hydraulic pistons together or independently of each other, and means for driving the working rolls.

2. In a rolling mill, comprising an integral housing having top and bottom walls adapted to form beams for the housing, end and side walls for the housing connecting the top and bottom walls, windows formed in the side walls, a plurality of pairs of working rolls having roll necks extending into the windows, thrust bearings on the roll necks, restraining plates for the thrust-bearings adapted to allow forward and backward movement to adjust themselves to the location of the rolls, a supporting bearing at the top and bottom of each pair of working rolls mounted in the housing, a concaved groove formed in each supporting bearing in which the working rolls are journaled and which support the said working rolls throughout their entire working length, a plurality of pistons operated by screw downs for applying pressure to each of the top bearings at intermediate points for controlling the contour and effective shape of the working rolls, yokes on the upper roll necks, resilient means connected to the yokes for holding the upper rolls against the upper bearings and the bearings in contact with the pistons and for lifting the upper rolls and their bearings when the pressure is released, means for laterally adjusting one end of each pair of working rolls in relation to the adjacent pairs of working rolls, and means for driving each pair of working rolls independently of each other.

3. In a rolling mill, comprising an integral housing, a plurality of pairs of working rolls mounted in the housing arranged to operate in sequence, a supporting bearing at the top and bottom of each pair of working rolls in the housing each formed in one piece and having a concaved groove in which said working rolls are journaled and which support the working rolls throughout their entire working length, an eccentric block connected to each end of the bearings, eccentric shafts journaled in the mill housing having eccentrics extending into the eccentric blocks, means for rotating the eccentric shafts to cant each pair of working rolls independently of each other, pistons mounted in the housing operated by screw downs for applying pressure to each of the top bearings at a plurality of intermediate points for controlling the contour and effective shape of the working rolls, and means for driving each pair of working rolls independently of each other.

4. In a rolling mill, comprising a housing, a pair of working rolls mounted in the housing, supporting bearings mounted in the housing disposed at the top and bottom of the pair of working rolls each formed in one piece and having a concaved groove in which said working rolls are journaled and which support said rolls throughout their entire working length, a series of cylinders mounted in the housing above the pair of working rolls, a pressure actuated piston working in each cylinder having its lower end engaging the upper surface of the top bearing adapted to transmit pressure to the pair of working rolls, and means for controlling the pressure in each of the cylinders to actuate the pistons individually or simultaneously.

5. In a rolling mill, comprising a housing, a pair of working rolls mounted in the housing, supporting bearings mounted in the housing and disposed at the top and bottom of the pair of working rolls each formed in one piece and having a concaved groove in which said working rolls are journaled and which support said working rolls throughout their entire working length, a series of relatively large cylinders mounted in the housing above the pair of working rolls, a pressure actuated piston working in each cylinder having its lower end engaging the upper surface of the top bearing adapted to transmit pressure to the pair of working rolls, an upwardly extending cylinder formed integral with each of the relatively large cylinders having a smaller bore, a long piston working therein having a threaded upper end, a combined worm wheel and nut threaded thereon, a worm meshing with each of the worm wheels connected by gearing to a motor for rotating the nuts for reciprocating the long pistons, a flexible fluid material between the lower end of each of the long pistons and the top of each of the pressure actuated pistons, and a magnetic clutch between the motor and each of the worms adapted to control the raising and lowering the long pistons together or independently.

6. In a rolling mill, comprising a housing, a plurality of pairs of working rolls mounted in the housing arranged to operate in sequence, supporting bearings mounted in the housing and disposed at the top and bottom of each of the pairs of working rolls each formed in one piece and having a concaved groove in which said working rolls are journaled and which support said working rolls throughout their entire working length, a series of relatively large cylinders mounted in the housing above each pair of working rolls, a pressure actuated piston working in each of said cylinders having its lower end engaging the upper surface of the top bearing adapted to transmit pressure to the pairs of working rolls, an upwardly extending cylinder formed integral with each of the relatively large cylinders each having a smaller bore, a piston working therein having an upwardly extending threaded end, a flexible fluid material between the lower end of each of the long pistons and the top of each of the pressure actuated pistons, a combined worm wheel and nut threaded thereon, a worm meshing with each of the worm wheels, each connected by gearing to a motor for rotating the nuts for reciprocating the pistons, and a magnetic clutch between a motor and each of the worms adapted to control the raising and lowering of the pistons together or independently.

7. In a rolling mill, comprising an integral housing, a plurality of pairs of working rolls mounted in the housing arranged to operate in sequence, supporting bearings mounted in the housing disposed at the top and bottom of each pair of working rolls, each formed in one piece and having a concaved groove in which the working rolls are journaled and which support the working rolls throughout their entire working length, a series of cylinders mounted in the housing above each pair of working rolls, a pressure actuated piston working in each of said cylinders having their lower ends engaging the upper surface of the top bearing adapted to transmit pressure to the pairs of working rolls, means for applying fluid pressure to the pistons, and means for controlling the fluid pressure to the pistons together or independently.

8. In a rolling mill, comprising an integral housing, a plurality of pairs of working rolls mounted in the housing arranged to operate in sequence, supporting bearings mounted in the housing and disposed at the top and bottom of each pair of working rolls, each of said bearings formed in one piece and having a concaved groove in which the working rolls are journaled and which support the working rolls throughout their entire working length, a series of relatively large cylinders mounted in the housing above each pair of working rolls, a piston working in each of said relatively large cylinders having its lower end engaging the upper surface of the top bearings at intermediate points adapted to transmit pressure to the pairs of working rolls, an upwardly extending cylinder formed integral with each of the relatively large cylinders having a smaller bore, a piston working therein, a fluid pressure medium between the top of the piston in the relatively large cylinders and the lower end of the piston in the cylinders with the smaller bore, and a screw down for raising and lowering the piston in the cylinders having the smaller bore together or independently to exert fluid pressure on the pistons in the relatively large cylinders.

9. In a rolling mill, comprising an integral housing, a plurality of pairs of working rolls mounted in the housing and arranged to operate in sequence, a supporting bearing at the top and bottom of each pair of working rolls in the housing, said bearings each formed in one piece and having a concaved groove in which said working rolls are journaled and which support the working rolls throughout their entire working length, a slot along one edge at each end of said supporting bearings, eccentric blocks each having a tongue adapted to fit in one of each of the slots, shafts journaled in the housing, an eccentric on one end of each shaft extending into an eccentric block, and means for rotating the eccentrics to laterally adjust the ends of the supporting bearings.

10. In a rolling mill, comprising an integral housing, a plurality of pairs of working rolls mounted in the housing and arranged to operate in sequence, a supporting bearing at the top and bottom of each pair of working rolls in the housing, said bearings each formed in one piece and having a concaved groove in which said working rolls are journaled and which support the working rolls throughout their entire working length, a slot along one edge at each end of said supporting bearings, eccentric blocks each having a tongue adapted to fit in one of each slots, shafts journaled in bearings at opposite sides of the housing, an eccentric on one end of each shaft extending into an eccentric block, a toothed segment secured to each of the opposite ends of the eccentric shafts, a shaft journaled in bearings extending from opposite sides of the housing adjacent to each of the toothed segments, pinions on the shafts meshing with the toothed segments, a worm wheel secured to each of said shafts, a worm meshing with each worm wheel having a shaft journaled in bearings extending from the housing, and a hand wheel on each worm shaft adapted to be manually operated to laterally adjust the ends of the supporting bearings.

HENRY W. NIEMAN.

REFERENCES CITED

The following references are of record in the file of this patent:

UNITED STATES PATENTS

| Number | Name | Date |
| --- | --- | --- |
| 103,667 | Sellers | May 31, 1870 |
| 165,819 | Hahn | July 20, 1875 |
| 385,437 | Baldwin | July 3, 1888 |
| 1,519,657 | Biggert | Dec. 16, 1924 |
| 1,634,258 | Halpin | July 5, 1927 |
| 1,708,185 | Mattei | Apr. 9, 1929 |
| 1,860,931 | Keller | May 31, 1932 |
| 2,058,717 | Paterson | Oct. 27, 1936 |
| 2,107,541 | Long | Feb. 8, 1938 |
| 2,124,518 | Marquart | July 19, 1938 |
| 2,187,250 | Sendzimir | Jan. 16, 1940 |
| 2,267,380 | Tyler | Dec. 23, 1941 |
| 2,275,113 | Simborg | Mar. 3, 1942 |